United States Patent [19]
Falat

[11] Patent Number: 6,074,733
[45] Date of Patent: Jun. 13, 2000

[54] DUAL OVENABLE PACKAGING

[75] Inventor: Ladislav Falat, Columbia, Md.

[73] Assignee: Westvaco Corporation, New York, N.Y.

[21] Appl. No.: 09/084,987

[22] Filed: May 28, 1998

[51] Int. Cl.$^7$ ..................................... B32B 23/06

[52] U.S. Cl. .......................... 428/219; 428/330; 428/331; 428/340; 428/511; 428/514

[58] Field of Search ..................................... 428/340, 334, 428/335, 219, 511, 514, 355 EN, 341, 330, 331; 427/365, 411

[56] References Cited

U.S. PATENT DOCUMENTS

| | | | |
|---|---|---|---|
| 5,418,008 | 5/1995 | Calvert | 427/203 |
| 5,855,973 | 1/1999 | Calvert et al. | 428/34.2 |
| 5,935,664 | 8/1999 | Clayton | 428/34.2 |

*Primary Examiner*—Paul Thibodeau
*Assistant Examiner*—D. Lawrence Tarazano

[57] ABSTRACT

Packaging material for food products capable of producing fiber tearing seals when adhered together is prepared from a C1S substrate by applying a base coat to the uncoated surface of the substrate before applying a sealable, moisture barrier, food contact coating over the base coat. Precoating the substrate improves coating holdout, reduces pinholes and enhances the bond between the barrier coating and the substrate to achieve the fiber tearing seals.

1 Claim, No Drawings

DUAL OVENABLE PACKAGING

BACKGROUND OF INVENTION

The present invention relates generally to food packaging and more particularly to paperboard based food packaging that includes a sealable, moisture barrier, product contact coating capable of producing fiber tearing seals when adhered together.

Packaging material of the type disclosed herein preferably comprises a paperboard substrate having a first side to which there has been applied a coating suitable for printing high quality graphics. Such substrates are known in the art as coated-one-side, or C1S paperboard substrates. It is also known in the art to employ for such packaging material a paperboard substrate to which there has been applied coatings suitable for printing high quality graphics on both sides. Such substrates are known in the art as coated-two-side, or C2S paperboard substrates. However, obviously, it is more expensive to utilize a C2S substrate than a C1S substrate for packaging, so there is a need in the art to develop C1S paperboard based packaging material for the intended purpose. Moreover, the use of a C2S substrate has been found to be less than desirable in providing fiber tearing seals when lids and trays prepared from such a substrate are heat sealed together, particularly with the use of some barrier materials.

In the case of paperboard based food packaging, at least one side of the paperboard substrate is preferably coated on the papermachine with a coating suitable for printing high quality graphics. Such coatings are usually applied in two steps. First, a base coat is applied, then a top coat is applied over the base coat. Compositionally, coatings useful for printing high quality graphics generally include a fluidized blend of minerals such as coating clay, calcium carbonate, and/or titanium dioxide with a suitable binder such as starch, polyvinyl alcohol, polystyrene or the like. These coatings are generally applied to the paperboard on a papermachine during the papermaking process by typical coating devices such as roll, rod, air knife or blade coaters. Successive densification and polishing of the coated surface by calendering finishes the surface to a high degree of smoothness and gloss to achieve a superior surface for high quality printing. In addition, at least one side of the paperboard substrate is also coated with a moisture barrier, product contact coating that is capable of being sealed either by heat sealing or with the use of microwave energy after the substrate is converted into food packages. Typical coatings used for this purpose in the past include extrudable resins such as low density polyethylene (LDPE), polypropylene (PP), and polyethylene terephthlate, (PET). However, the use of extrudable resins for such purpose must be done in a separate process, that is generally remote from the papermachine where most coatings are applied, which entails increased costs and handling. Moreover, the use of extruded resins for product contact coatings generally requires a thick film to achieve the desired moisture barrier protection and sealing results. Suitable and effective product contact coatings can also be applied to a paperboard substrate with the use of coatings prepared from emulsions such as acrylics, ethylene vinyl chloride (EVCL), polyvinylidene chloride (PVDC), and PET. However, the application of such coatings on a papermachine is generally not done because of the high costs associated with small orders and the high speed of papermachines.

In order to overcome these and other problems, the method disclosed in U.S. Pat. No. 5,418,008 was developed. According to the teachings of the '008 patent, a paperboard substrate which has been previously coated on one (C1S) or both (C2S) surfaces is applied with a continuous film of a moisture resistant, product contact barrier material, at a low coat weight, in a single pass, on a printing press, at the same time that the substrate is printed and converted into blanks for forming food packages. Unfortunately, the practice of the invention disclosed in the '008 patent has been discouraging due to poor coating holdout, drying problems and high coating consumption, particularly with the use of C1S paperboard, and with the inability to achieve consistent fiber tearing seals with the use of C2S paperboard. Accordingly, the present invention was developed to improve upon and overcome problems with the practice of the invention disclosed in the '008 patent.

SUMMARY OF INVENTION

U.S. Pat. No. 5,418,008 discloses a method for making paperboard based packaging material for food products using as a substrate clay coated paperboard, either C1S or C2S. Not surprisingly, the preferred substrate is C2S paperboard, since the amount of product contact barrier material needed to achieve adequate barrier properties is less with C2S paperboard than with C1S paperboard. Unfortunately, C2S paperboard is more costly than C1S paperboard, and in practice, seals between two barrier coated surfaces of C2S paperboard have been found to be highly dependant upon the type of barrier coating used. For example, with the use of an acrylic barrier coating (styrene acrylate), fiber tearing seals can be achieved with the use of a C2S substrate, but its use as a packaging material is otherwise unacceptable because it lacks the flexibility to form trays which may have 180 degree folds. Meanwhile, EVCL barrier coat, when applied to a C2S substrate yields poor adhesion resulting in non-fiber tearing seals, but when applied to the uncoated side of a C1S substrate, fiber tearing seals can be achieved. Unfortunately, the combination of EVCL applied to the uncoated surface of a C1S substrate has an unacceptable MVTR (Moisture Vapor Transmission Rate). Thus it would be desirable to modify the C1S substrate to solve the MVTR problem while retaining the desired fiber tearing adhesion.

In this regard, it has been found according to the present invention, that the most cost effective substrate, C1S paperboard, may be modified to produce an acceptable MVTR and retain its ability to achieve fiber tearing seals, without unduly increasing its cost, and without the necessity of performing additional steps not normally associated with the manufacture of the substrate on a papermachine or with the application of a barrier coating on a printing press. This result can be achieved by applying to the uncoated side of a C1S substrate, a base coating only, either on the papermachine or on the printing press, or on any other suitable coating apparatus, to achieve a surface that adheres well to a subsequently applied barrier coating and thus provides the desired fiber tearing seals. Such seals have been found to be successful using either heat or microwave energy. The success of the present invention is believed to be based on the fact that by using a base coating only on the otherwise uncoated side of the C1S substrate, a surface is produced that is much rougher than the surface of a C2S substrate. This rougher surface allows the barrier coating to become more firmly bound to the base coated surface of the C1S substrate, and achieve the desired fiber tearing seals with a good MVTR. In a laboratory experiment, at 30× magnification, the base coated only surface of a C1S substrate appeared to be much rougher than the twice coated surface of a C2S substrate, yet the MVTR of the base coated C1S substrate was comparable to that of a C2S substrate. The bonding of the barrier coating to the base coated only C1S substrate is believed to be purely mechanical since the rougher base coated surface contains exposed fibers of the paperboard which improves the mechanical bond. In an effort to duplicate this same rougher surface on a conventional C2S substrate to improve adhesion with the barrier coat, both steam treatment and corona treatment were tried. However, corona treatment was ineffective to improve adhesion, and while steam treatment increased the surface roughness, no increase in barrier coat adhesion was observed.

DETAILED DESCRIPTION

The method of the present invention has been established in accordance with the following Example. It will be understood that the Example is illustrative only, and should not present any limitation on the practice of the invention, since it will be understood that various modifications can be made in the invention substantially within the scope of the appended claims.

EXAMPLE

A C1S substrate was base coated by applying from about 5–8 lbs/ream (ream size 3000 square ft), of a base coating to the uncoated surface. The base coating comprised a 50/50 blend of coarse calcium carbonate and #2 clay (such as Atomite PG-3 or Hydrasparse), with small additions of PVA and protein binders (e.g. NS 1103 and Procote 200). A barrier coating of EVCL was applied over the base coat and the coated samples were subjected to a peel test to determine the degree of adhesion of the barrier coating to the substrate. For this purpose, a slip/peel tester manufactured by Instrumentors, Inc. was used. In the test, the barrier coating is peeled from strips of the coated substrate at a constant speed as the effort is measured. The load cell measures the peel force in grams. Other samples of a C2S substrate were coated with the same EVCL barrier coating to be used as a control. Samples of the C2S substrate were also treated with corona and steam to roughen the surface and perhaps improve polymer adhesion. The results are shown in the following tables.

TABLE 1

Laboratory Drawdowns - EVCL Coating

| Substrate sample | Peel Force (grams) |
| --- | --- |
| C2S | 164 |
| C2S (steam treated) | 176 |
| C1S (base coated - 8 lbs/ream) | 205 |

(Peel Force - Average of 5 Determinations)

TABLE 2

Press Applied - EVCL Coating

| Substrate Sample | Peel Force (grams) |
| --- | --- |
| C2S | 207 |
| C2S (corona treated) | 197 |
| C1S (base coated - 8 lbs/ream) | 309 |

(Peel Force - Average of 5 Determinations)

TABLE 3

Press Applied - EVCL Coating

| Substrate Sample | Peel Force (grams) |
| --- | --- |
| C2S | 192 |
| C1S (base coated - 8 lbs/ream) | 325 |
| C1S (base coated - 5 lbs/ream) | Fiber Tear |

(Peel Force - Average of 5 Determinations)
(Fiber Tear - Test abandoned)

TABLE 4

Press Applied - EVCL Coating

| Substrate Sample | Peel Force (grams) |
| --- | --- |
| C2S | 163 |
| C1S (base coated - 5 lbs/ream) | Fiber Tear |
| C1S | Fiber Tear |

(Peel Force - Average of 5 Determinations)
(Fiber Tear - Test abandoned)

TABLE 5

Press Applied - EVCL Coating

| Substrate Samples | MVTR (gr./100 in$^2$/day) |
| --- | --- |
| C2S (#18 rod) | 6.7 |
| C1S (#18 rod - base coated) | 8.7 |
| C2S (#10 rod) | 11.6 |
| C1S (#10 rod - base coated) | 14.1 |
| C1S (#18 rod) | 40 (in excess of) |

(No Pinholes except for C1S - #18, rod sample)
(Test Conducted at 38° C., 90% RH)

From the above it will be seen that the force required to peel the EVCL coating from the substrate was greater for base coated C1S substrates than for C2S substrates (treated or untreated). It will also be noted that for the base coated C1S substrate in Table 3, fiber tear can be achieved with a base coating of 5 lbs/ream. Finally, as shown in Table 5, satisfactory MVTR's can be achieved with both a C2S substrate and a C1S base coated product.

While the above description is primarily directed to food packaging applications, it is to be understood that the present invention could also be applicable to other paperboard packaging applications where barrier properties and/or heat sealable properties are required. The advantage of the present invention is that the packaging material of the present invention can be made without the use of expensive off-machine applications, particularly extrusion coating applications.

What is claimed is:

1. Paperboard packaging material capable of producing fiber tearing seals when two surfaces are adhered together, comprising:

(a) a paperboard substrate having two sides;

(b) a finished coating on one side of said substrate to provide an outer smooth, printable surface;

(c) a base coating, comprising from 3–8 lbs/ream wherein the ream size is 3000 ft$^2$, of a 50/50 blend of calcium carbonate and No. 2 clay, on the other side of said substrate to provide a surface for accepting a sealable moisture barrier top coat; and, (d) a sealable moisture barrier top coat, comprising from 3–9 lbs/ream of an ethylene vinyl chloride copolymer, over said base coat to provide an inner product contact surface.

* * * * *